United States Patent
Harris et al.

(10) Patent No.: US 6,500,062 B1
(45) Date of Patent: Dec. 31, 2002

(54) SEPARATION USING AIR FLOWS OF DIFFERENT VELOCITIES

(75) Inventors: Henry David Harris, Toowoomba (AU); Malcolm Ernest McKay, Toowoomba (AU); Katherine Nicole Joyce, Mackay (AU)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/582,192

(22) PCT Filed: Dec. 21, 1998

(86) PCT No.: PCT/AU98/01053
§ 371 (c)(1),
(2), (4) Date: Jun. 23, 2000

(87) PCT Pub. No.: WO99/33580
PCT Pub. Date: Jul. 8, 1999

(30) Foreign Application Priority Data

Dec. 24, 1997 (AU) .............................. PP 1119

(51) Int. Cl.⁷ ............................. A01F 12/44; B07B 1/00
(52) U.S. Cl. ........................................... 460/79; 56/14.6
(58) Field of Search ............................. 460/79, 73–74, 460/84–89, 113; 56/14.6; 209/20, 137, 139.1, 468, 294; 127/2, 42

(56) References Cited

U.S. PATENT DOCUMENTS

| 3,608,597 A | | 9/1971 | Hill | |
|---|---|---|---|---|
| 3,827,443 A | * | 8/1974 | Drayer | 460/16 |
| 3,920,542 A | * | 11/1975 | Laird et al. | 209/134 |
| 4,033,555 A | * | 7/1977 | Fong | 366/101 |
| 4,250,897 A | * | 2/1981 | Glaser | 460/69 |
| 4,431,530 A | | 2/1984 | Syben | |
| 4,464,887 A | * | 8/1984 | Decoene et al. | 56/16.5 |
| 4,572,741 A | * | 2/1986 | Mason | 127/2 |
| 4,652,362 A | * | 3/1987 | Mueller | 209/44.2 |
| 4,755,284 A | | 7/1988 | Brooks et al. | |
| 4,915,824 A | * | 4/1990 | Surtees | 209/139.1 |
| 5,251,763 A | | 10/1993 | Morris | |
| 5,348,161 A | * | 9/1994 | Mueller | 209/29 |
| 5,394,679 A | * | 3/1995 | Schlueter | 56/30 |
| 5,409,118 A | * | 4/1995 | Bielagus et al. | 209/136 |
| 5,964,355 A | * | 10/1999 | Raura | 209/20 |

FOREIGN PATENT DOCUMENTS

| AU | 31234/7 | 1/1973 |
|---|---|---|
| AU | 13057/83 | 10/1983 |

\* cited by examiner

Primary Examiner—Robert E. Pezzuto
Assistant Examiner—Árpád Fábián Kovács

(57) ABSTRACT

An apparatus for separation of components having differing terminal velocities. The apparatus provides a substantially elongate, upwardly projected air flow acting to agitate, sort and separate the components according to a terminal velocity of each of the components. The apparatus also forms a bed of the components above the upwardly projected air flow and entrains a class of the components out of the bed.

22 Claims, 6 Drawing Sheets

SEPARATION USING AIR FLOWS OF DIFFERENT VELOCITIES

FIELD OF THE INVENTION

This invention relates to an apparatus and method for effecting the separation of items with different terminal velocities, such as sugar cane billets and leaf, as achieved in cane harvesters. In particular, it relates to the use of air flows of differing velocities to separate leaf and other trash from sugar cane billets.

BACKGROUND TO THE INVENTION

Various mechanisms are known whereby separations, such as the separation of billets of sugar cane from leaves, tops and other trash picked up by a harvester, are achieved. For sugar production it is desirable to efficiently separate sugar billets from other matter so as to deliver a clean product to sugar mills for crushing.

This separation has typically been attempted, albeit somewhat ineffectively, in cane harvesters during harvest. In most known arrangements a flow of air is drawn through the cane as it passes through the harvester. One such arrangement is described in Australian Patent No. 569800 in the name of Claas OHG. This patent describes a separation process wherein harvested cane is carried up an inclined belt conveyor. At the end of the conveyor the cane and other material falls onto a transverse conveyor. Air is blown through the falling cane to separate lighter material from the heavier cane billets. A suction fan is mounted above the conveyor belt to assist with ejection of the separated material.

The Claas approach fails to achieve efficient separation at acceptable harvesting rates. Leaf is caught between cane billets and retained while some billets are discharged with leaf material. A more efficient approach is required.

In other approaches air is drawn through a moving bed of cane to separate cane billets from trash. Successful separation depends on utilising the difference in terminal velocity of a billet (typically 20 m/s) and other inclusions to the harvested cane such as tops (typical terminal velocity of 15 m/s) and leaves (typically 5 m/s). The usual configuration in a harvester is with a fan drawing air through the cane bed. Commonly used fans do not provide a uniform velocity profile over the whole treatment area. Uniformity of air flow is greatly affected by the air inlet conditions and geometry of the chamber in which the separation is effected and other factors including the presence and properties of the cane bed itself. Consequently, such means of separating trash from cane billets have not proven efficient because they result in a loss of cane billets ejected with the trash from some parts of the treatment area and the retention of trash in other parts.

Another approach to cleaning trash from cane billets is a modification of the Claas approach described above. A jet of air is blown through a curtain of falling cane to eject the trash. This configuration enables better control over air velocity and hence improved efficiency of separation. However, there is still room for improvement in the quality of the end product and in minimising loss of cane billets. Furthermore, the rate of processing must be increased to match the increase in harvesting speed with modern harvesters.

All of the above described methods cause a loss of cane when applied to billets in a cane harvester, and additionally they fail to remove sufficient extraneous matter. Cane is lost because it becomes entrained with leaf material or it is projected into the fan blades. Leaf can be trapped by the billets and not removed. Variation in density of the cane bed can cause zones where the air velocity is impeded and reduced and the effectiveness of the flow as a separation mechanism at these zones is consequently reduced.

OBJECT OF THE INVENTION

It is an object of the present invention to provide an apparatus and method to improve the efficiency and effectiveness of the separation of objects, items, components, and the like, into distinct classes characterised by terminal velocity.

It is a further object of the invention to substantially ameliorate one or more of the identified shortcomings in the known prior art.

Further objects will be evident from the following description.

DISCLOSURE OF THE INVENTION

In one aspect the present invention provides an apparatus for separation of components having differing terminal velocities, including means for providing an upwardly projected air flow, said air flow acting to agitate, sort and separate said components according to a terminal velocity of each of said components, means for forming a bed of said components above said upwardly projected air flow, means for entraining a class of said components out of the bed, said means for providing said upwardly directed air flow including a narrow, elongate jet means extending substantially across said bed of said components.

In one form of the invention the bed of components is formed by projecting the components into and through the upwardly projected airflow. In another form of the invention, the components are distributed on a conveyor means which carries the components through the upwardly projected airflow.

In preference the apparatus further comprises a separation zone formed in the bed of components by the flow of air whereat components are distributed according to terminal velocity with lower terminal velocity components displaced upwardly with respect to higher terminal velocity components.

The components may be definable in classes wherein each class has a characteristic terminal velocity, and the terminal velocities of the components in the class are distributed about a mean value which is the characteristic terminal velocity.

In preference the means for entraining a class of said components is a low speed fan drawing an entraining air flow away from the bed of components, said entraining air flow entraining low terminal velocity components. The entraining air flow preferably acts throughout and/or adjacent the separation zone.

The upwardly projected flow of air and the entraining air flow act cooperatively to sort and segregate classes of components.

In preference the upwardly projected air flow has a velocity of between 20 m/s and 60 m/s and preferably in the range 30 m/s and 50 m/s. Most preferably the velocity of the upwardly projected air flow is 40 m/s.

The entraining air flow preferably has a velocity of between 2 m/s and 20 m/s. Most preferably the velocity of the entraining air flow is 12 m/s.

In a second aspect the present invention is a self-propelled harvester comprising cutting and gathering means at a forward end of the harvester; chopping means adjacent the cutting and gathering means for chopping harvested cane into billets and trash; means for projecting said billets and trash into a separation zone; separation means as defined above providing at least one narrow, upwardly projected air flow through the separation zone, said air flow acting to agitate, sort and separate the billets and trash, said entraining means entraining the trash out of the separation zone.

In one form the chopping means and the means for projecting said billets and trash into a separation zone are a single means such that the billets and trash are projected into the separation zone immediately after chopping.

The harvester may suitably include conveyor means adjacent the projection means, said billets and trash forming a bed on the conveyor means. In preference the conveyor means conveys the bed of billets and trash through the upwardly projected air flow. The conveyor means suitably comprises a belt of open mesh material.

Alternatively, the projection means forms an unsupported bed in the separation zone.

The means for entraining the trash out of the bed is suitably a low speed fan drawing an entraining air flow from the bed at a velocity sufficient to entrain the trash. The low speed fan is suitably located downstream of the upwardly projected air flow.

BRIEF DETAILS OF THE DRAWINGS

To assist in understanding the invention preferred embodiments will now be described with reference to the following figures in which.

DETAILED DESCRIPTION OF THE DRAWINGS

Figure 1:
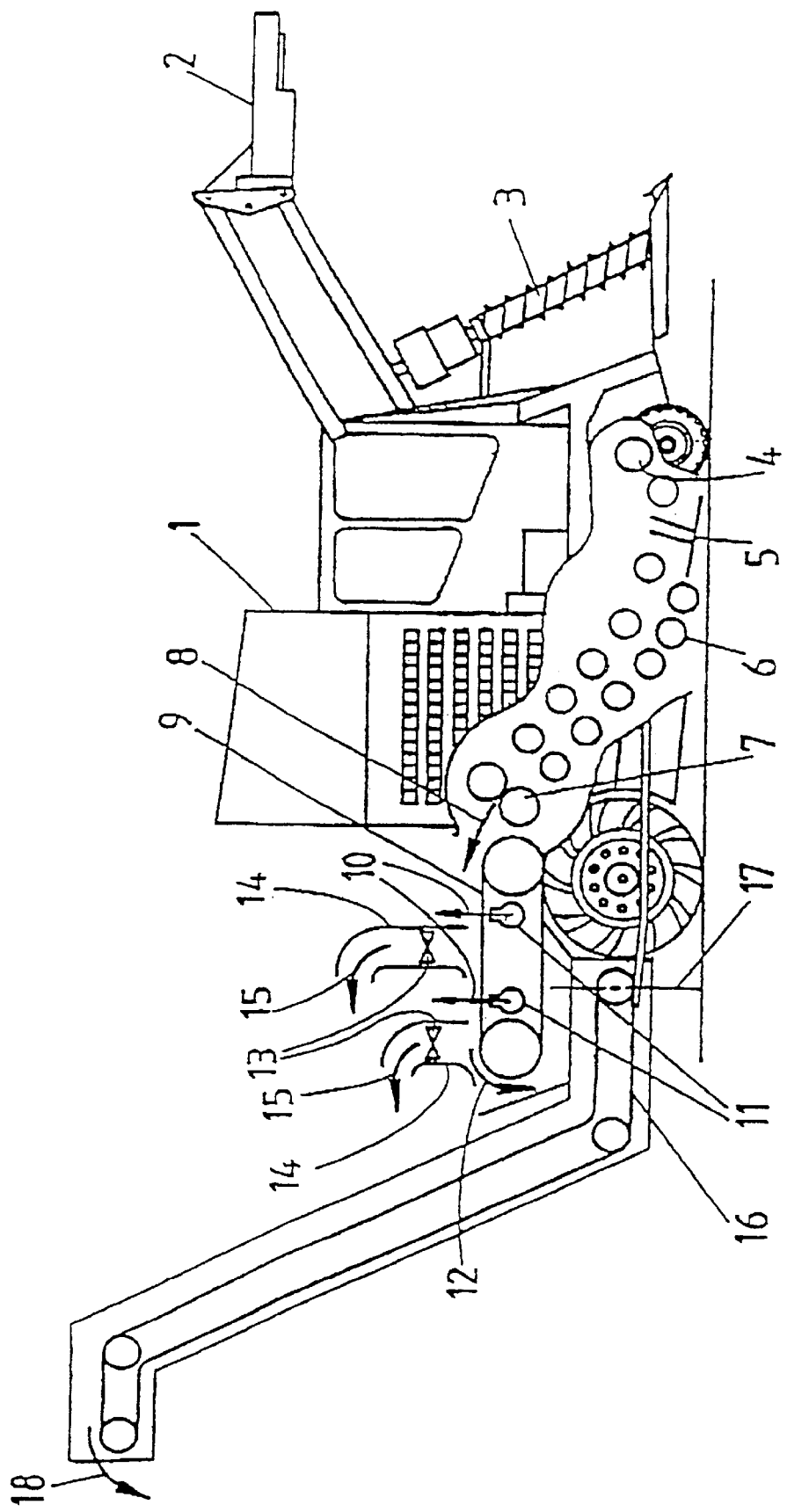
FIG. 1 is a first embodiment of a sugar cane harvester having means for separating billets of sugar cane from trash.

In the drawings, like reference numerals refer to like parts.

Referring to FIG. 1, there is shown schematically a first embodiment of a selfpropelled harvesting machine 1, specifically designed for harvesting sugar cane. In conventional manner the sugar cane tops are cut by a topper 2 and the cane is lifted by croplifter spirals 3. A knockdown roller 4 levels the cane as it is cut by the basecutter 5. The cut cane is conveyed by feed rollers 6 to choppers 7 that chop the cane stalks into billets. The cane billets as well as trash, including tops and leaves, is transported in the direction of arrow 8 to a conveyor 9. A bed of cane, tops and leaves is formed on the moving conveyor.

The conveyor 9 is made of open mesh material that allows the passage of upwardly projected jets of air 10 from nozzles 11. The conveyor moves in the direction indicated by arrow 12. The nozzles 11 are narrow, elongate nozzles that produce a jet of air that is narrow with respect to the direction of motion of the conveyor which extends across the width of the conveyor 9. As depicted in the embodiment of FIG. 1 there are two nozzles spaced along the direction of motion of the conveyor however this is not essential for the operation of the invention.

A "narrow" jet (or air flow) in this instance is one where the effective length of the jet is substantially equal to the width of the separation zone and the width of the jet is no more than a fifteenth, and preferably about a twentieth of its effective length. The effective length of the jet being the length of a single outlet extending for the full width of the separation zone or the sum of a plurality of outlets disposed in a row extending for the full width of the separation zone. In the present embodiment the outlet from nozzle 11 is substantially rectangular having a length of about 1000 mm and a width of about 35–45 mm.

It has been established by the inventors that a "narrow jet" producing an air flow of approximately 50 m/s will agitate and lift the bed of cane and trash so as to sort and segregate the moving bed into different classes according to the terminal velocity of each class. Lower terminal velocity components, such as leaf and tops, are sorted to the top of the bed while higher terminal velocity components, such as cane billets, remain towards the bottom of the bed.

When the bed passes over the narrow jet, the bed rises or decompacts, is agitated by the air flow therethrough, and is broken up. Trash, including leaf and tops, is sorted to the top of the mat and some is blown away. The remainder of the trash is extracted by fans 13 operating in suction ducts 14. The trash is ejected from the harvester 1 as indicated by arrows 15. The cane billets, now cleaned of trash, fall from the end of conveyor 9 in the direction of arrow 12 onto an elevator 16. The elevator 16 is pivotable about a vertical axis 17, in conventional manner. The billets are discharged from the elevator at 18 into an in-field bin (not shown).

Although the jets of air 10 are effective in removing trash there is no removal of cane billets. It will be appreciated that the velocity of the upwardly projected jet of air is greater than the terminal velocity of the cane billet. The inventors postulate that a billet remains on the conveyor because a billet placed in the air jet, either lengthwise or crosswise, falls out of the jet. Thus a billet is not entrained by the air flow and therefore is not ejected from the harvester with the trash. This is partly due to the velocity of the air jet relative to the terminal velocity of the billet and partly due to the shape of the cane billet relative to the shape and size of the air jet. The air jet should be sufficiently narrow that a cane billet cannot be completely contained within the air jet and therefore entrained. The inventors have found that the air velocities described herein are suitable for cleaning sugar cane billets. If the invention is applied to other materials the air velocities will change accordingly.

In contrast, a fan over the mat, sufficient to induce a flow of approximately 12 m/s will lift and remove the trash at the top of the mat. The inventors have found that if the fan is placed above the mat just downstream of the elongate jet, as shown in FIG. 1, it will more effectively remove the trash from the cane bed. The combined action of the jet of air 10 and fan 13 forms a separation zone 19 in the bed 20, as shown most clearly in FIG. 2. The direction of travel of the cane bed is shown by arrow A. The separation zone 19 extends a small way upstream of the jet of air 10 and a larger distance downstream. As mentioned above, a stratification of the components of the bed occurs in the separation zone such that the lighter components are at the top and available for removal.

Figure 2:
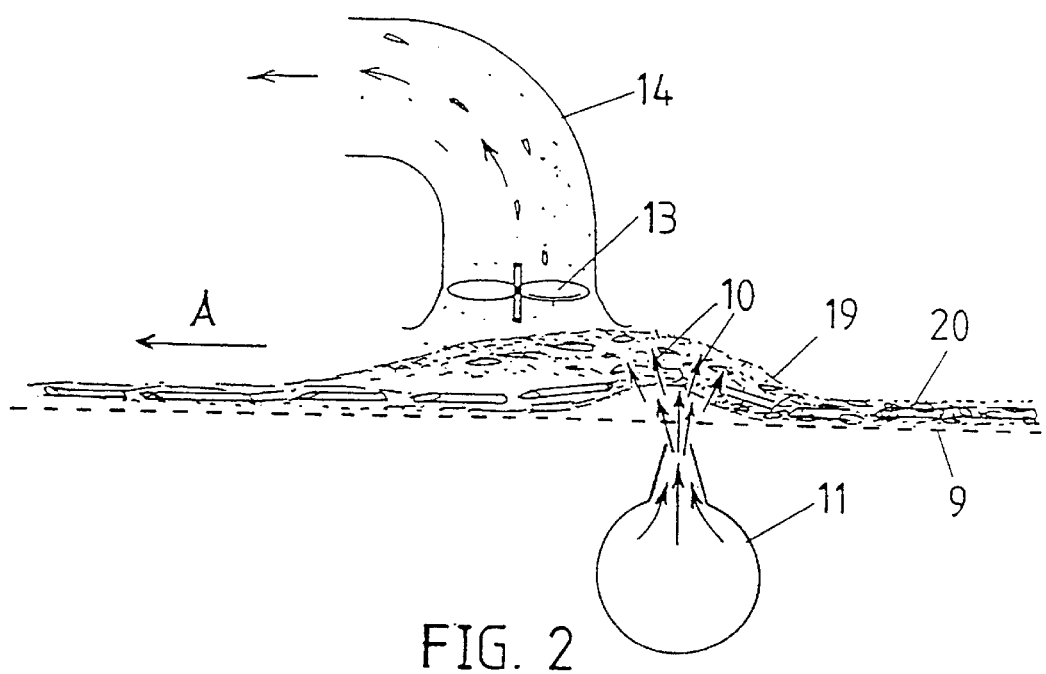
FIG. 2 is an enlarged view of the separating means of FIG. 1.
Figure 3:
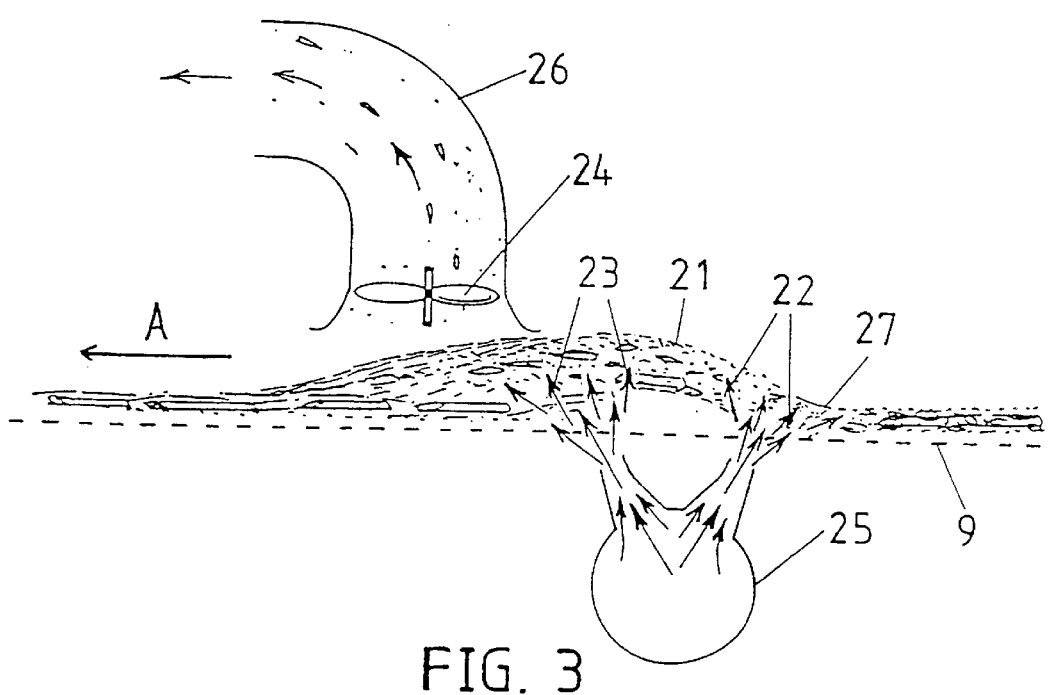
FIG. 3 is an alternate nozzle arrangement.

FIG. 3 shows an alternate embodiment wherein the separation zone 21 is formed by a pair of air jets, 22, 23 and an extraction fan 24. The air jets are supplied from a nozzle 25 having two outlets. The fan 24 operates in an extraction duct 26. As with the embodiment of FIG. 2 the bed of cane and trash 27 is raised and stratified. The lighter components at the top of the stratified bed are removed by the extraction fan 24. The double air jet forms a more extensive separation zone and allows for more complete stratification. In situations where there is a high trash content the single air jet embodient may not provide sufficient sorting to achieve the desired cleaning of the cane billets and hence the two jet embodiment may be more suitable.

It will be appreciated that in some situations it may be appropriate to employ three or more closely spaced nozzles to lift, agitate and separate the cane and trash.

Figure 4:
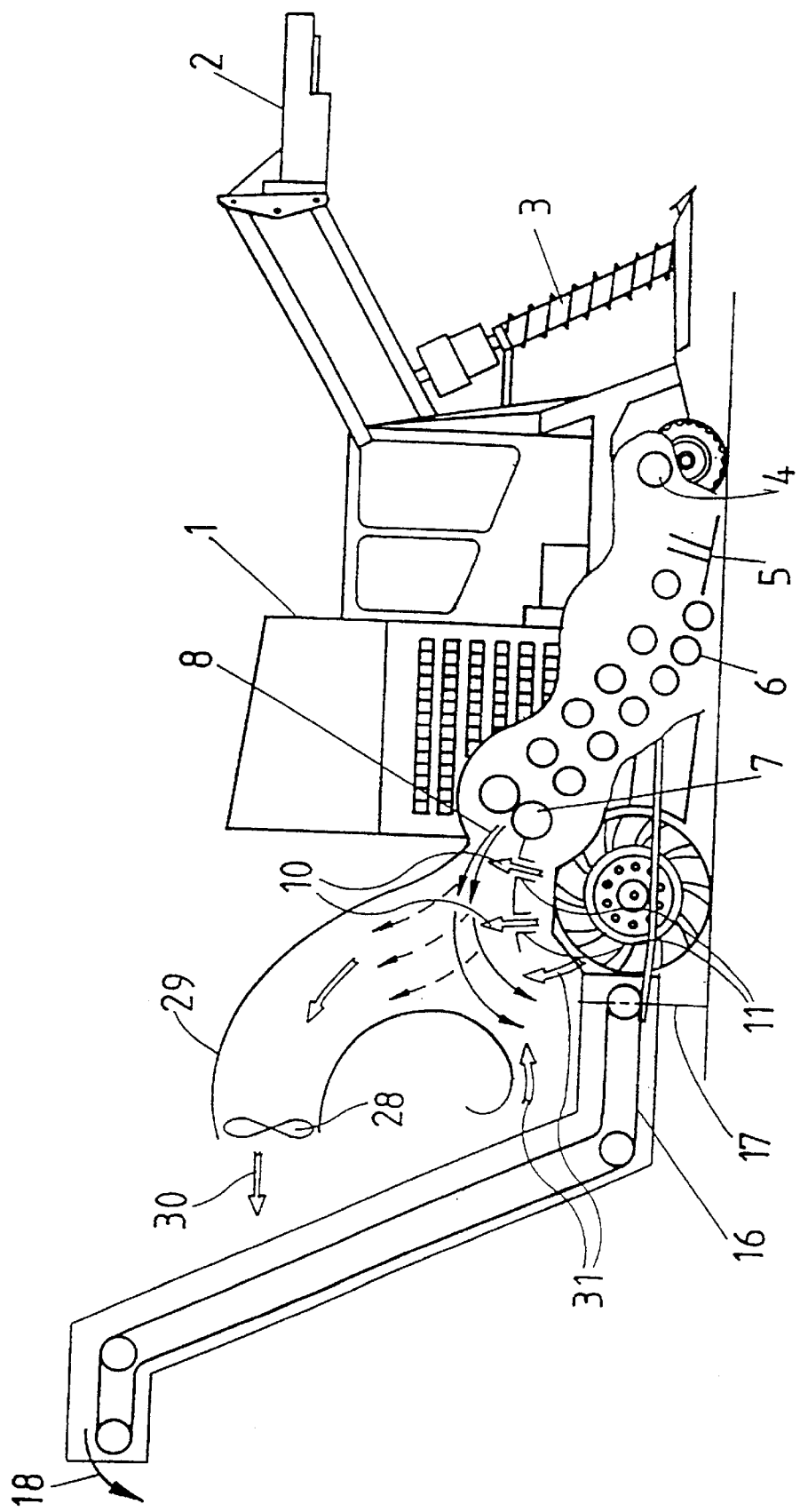
FIG. 4 is a second embodiment of a sugar cane harvester having means for separating billets of sugar cane from trash.

An alternate embodiment of a self-propelled harvesting machine is shown schematically in FIG. 4. As with the embodiment shown in FIG. 1, the self-propelled harvesting machine 1 is specifically designed for harvesting sugar cane. In conventional manner the sugar cane tops are cut by a topper 2 and the cane is lifted by croplifter spirals 3, as previously described. The knockdown roller 4 levels the cane which is cut by the basecutter 5. The cut cane is conveyed by feed rollers 6 to choppers 7 that chop the cane stalks into billets. The cane billets as well as trash, including tops and leaves, is projected in the direction of arrow 8 to form an unsupported bed of cane, tops and leaves.

Elongate nozzles 11 produce jets of air 10 that are narrow with respect to the direction of motion of the billets and trash and which extend across the width of the unsupported bed. As shown in FIG. 4, there are two nozzles spaced along the direction of motion of the billets and trash, however this is not essential for the operation of the invention.

As with the previous embodiment, the unsupported bed rises or decompacts as it passes over the narrow jets 10. Trash, including leaf and tops, is sorted to the top of the bed and some is blown away. The remainder of the trash is extracted by fan 28 operating in duct 29. The fan 28 draws low velocity air into the bottom of the duct 29 as indicated by arrows 31. The trash is ejected from harvester 1 in the direction of arrow 30. The cane billets continue their trajectory onto elevator 16 and are discharged from the elevator at 18, as previously described.

Figure 5:
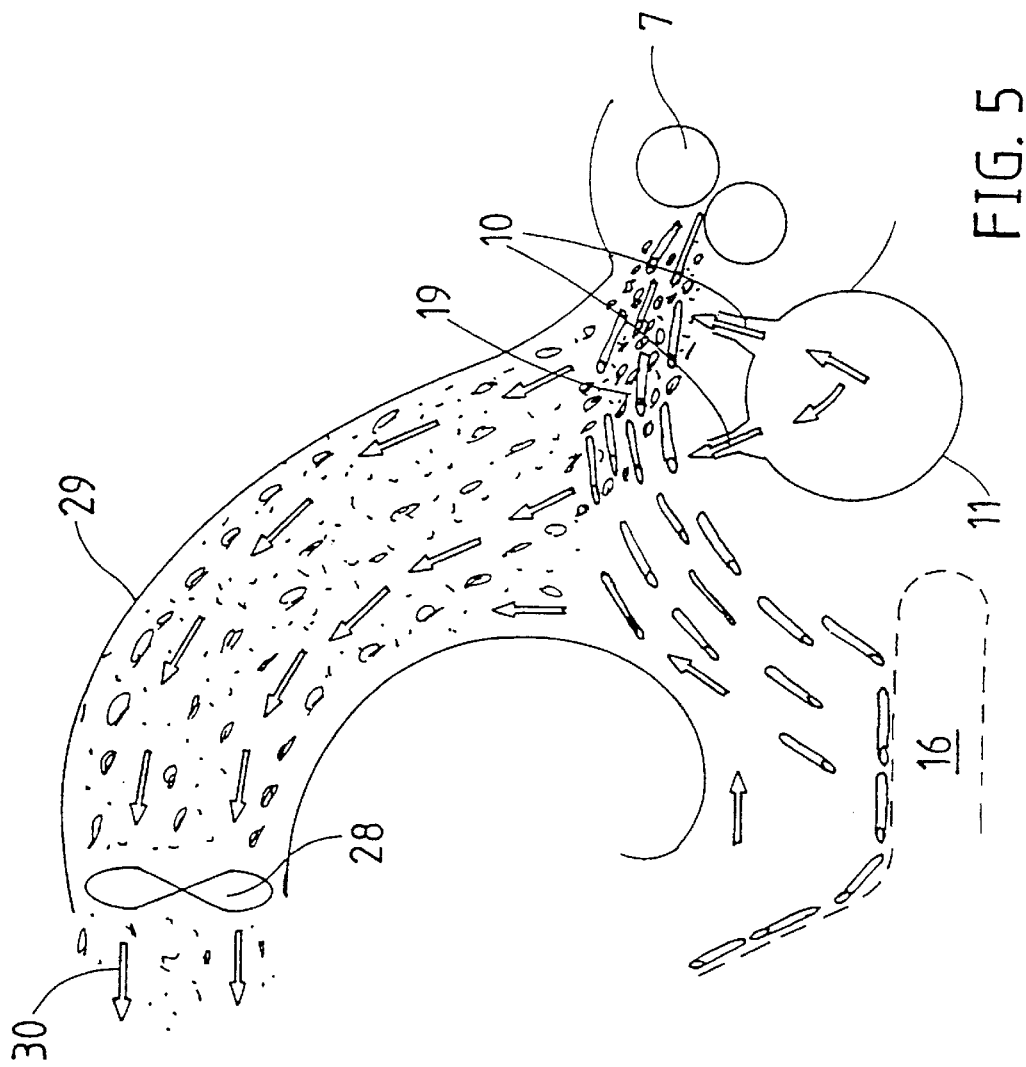
FIG. 5 is an enlarged view of the separating means of FIG. 4.

An enlarged view of the separation zone is shown in FIG. 5. As can be seen, the cane billets essentially follow a trajectory from the choppers 7 to the elevator 16. The jets of air 10 act to fluidise the unsupported bed of billets and trash thereby causing a separation of material according to terminal velocity. The entraining air flow generated by extractor fan 28 acts throughout the separation zone 19 to draw away trash. This differs from the first embodiment where the entraining air flow acted adjacent the separation zone 19, as shown in FIG. 2 and FIG. 3.

Figure 6:
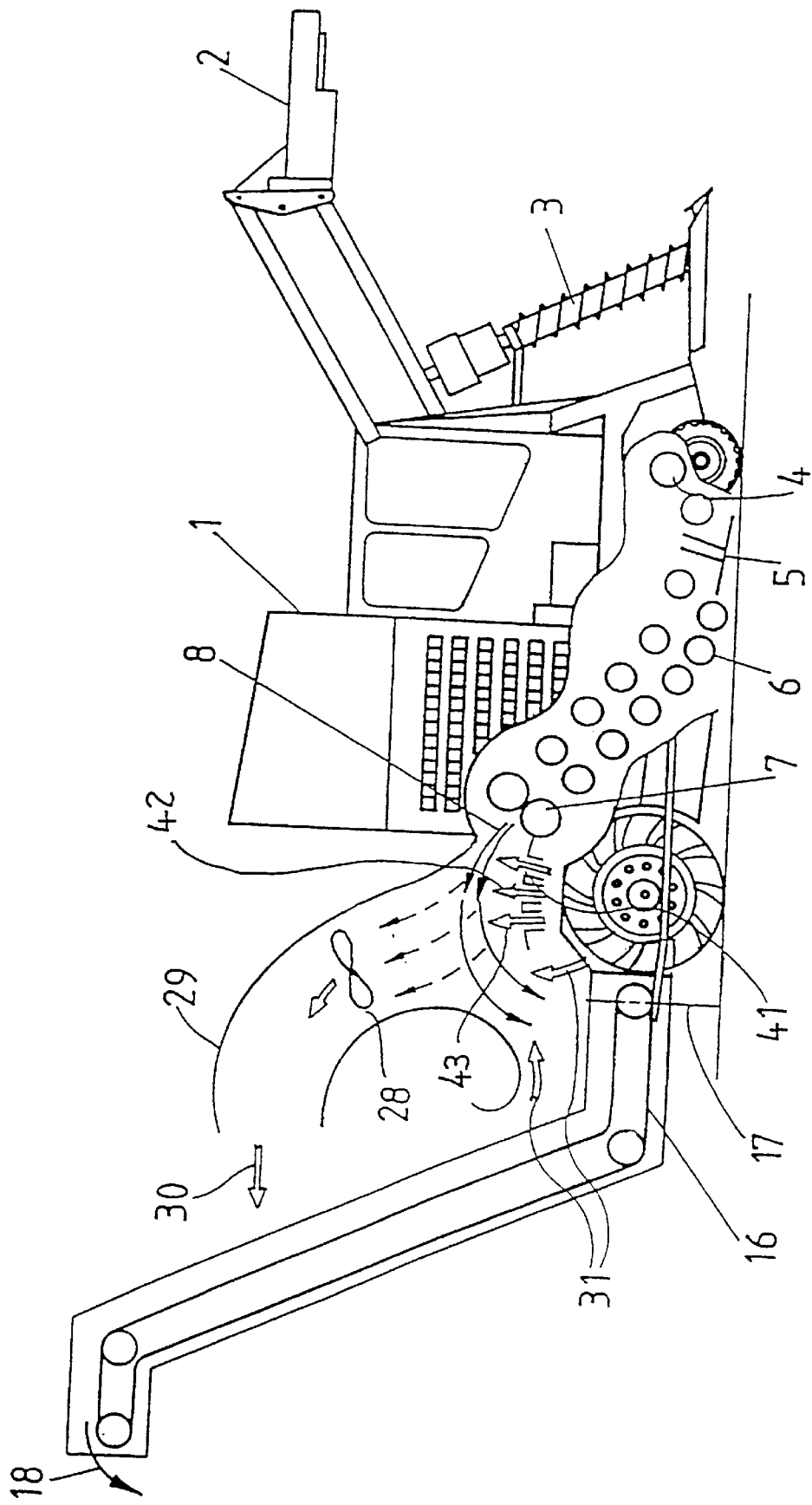
FIG. 6 is a third embodiment of a sugar cane harvester having means for separating billets of sugar cane from trash.
Figure 7:
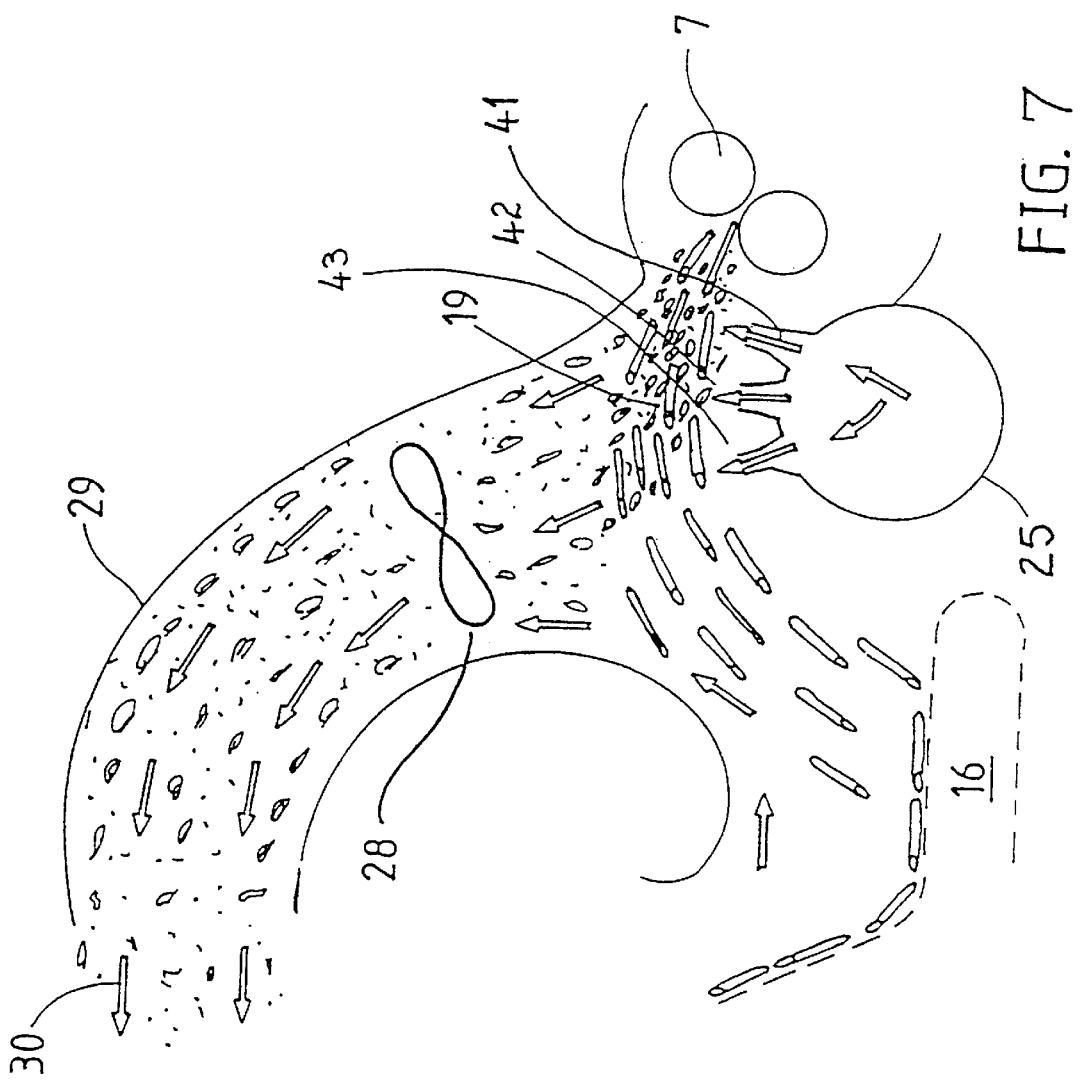
FIG. 7 is an enlarged view of the separating means of FIG. 6.

FIGS. 6 and 7 show a third embodiment of a sugar cane harvester wherein the separation zone 19 is formed by three air jets 41, 42 and 43 and an extraction fan 28. The air jets 41, 42 and 43 are supplied from a nozzle 25 having three rectangular narrow outlets. The fan 28 operates in extraction duct 29. As with the earlier embodiments the bed of cane is raised and stratified. The lighter components at the top of the stratified bed are removed by the extraction fan 29. The triple air jet forms a more extensive separation zone and allows for more complete stratification than in the single and double air jet embodiments of FIGS. 2 and 3 respectively.

To ameliorate stratification within the separation zone 19, it is preferable to vary the width of the rectangular outlets through which the air jets 41, 42 and 43 pass. In the embodiment shown in FIGS. 6 and 7, the outlet associated with air jet 41 has a width of about 20 mm; the outlet associated with jet 42 has a width of about 45 mm; and the outlet associated with jet 43 has a width of about 60 mm. By thus varying the width of the outlets, the penetration of the downstream air jet 43 into the separation zone 19 is greater than air jet 42, which in turn is greater in penetration than air jet 41. This graduates the stratification process which allows for more efficient removal of trash from the separation zone 19.

It will be appreciated that the second and third embodiments are able to utilise the primary extractor of conventional harvesters thereby minimising the effort required to retrofit the invention. Although a double air jet is shown with the second embodiment and a triple air jet is shown in the third embodiment, it will be appreciated that a single air jet, such as shown in FIG. 2, can also be employed. The principle of operation of the invention is the same in all three embodiments.

In each of the above embodiments, the suction ducts 14, 26 and 29 are open at the front of the apparatus to draw additional air, as dictated by the arrow 31 in FIG. 4, into the separation zone to assist in sorting and separating the components according to their terminal velocities.

Although the invention has been described in terms of its application to cleaning the trash from cane billets in a sugar cane harvester, it will be appreciated that it is applicable to any situation requiring the separation of components having different terminal velocities. In such situations, the components can generally be divided into distinct classes having similar terminal velocities. The technique is more effective the more distinctly different are the terminal velocities of the respective classes of components being sorted. Effectiveness is also greater when each class of component being sorted is characterised by there being minimal variation in terminal velocity amongst components within the class. The invention may therefore be applied to separation of trash from such crops as potatoes, beans, carrots, fruit, grain, etc.

The inventors have found that when the invention is applied to a sugar cane harvester the effective separation rate can be increased because the separation zone is wider than with known separation techniques.

Throughout the specification the aim has been to describe the preferred embodiments of the invention without limiting the invention to any one embodiment or specific collection of features.

What is claimed is:

1. A self-propelled harvester comprising cutting and gathering means at a forward end of the harvester, chopping means adjacent the cutting and gathering means for chopping harvested cane into billets and trash, means for projecting said billets and trash onto a conveyor means adjacent said means for projecting, said conveyor means defining a bed of billets and trash thereon and further defining a separation zone, apparatus for separation of components of billets and trash having differing terminal velocities, including means for providing an upwardly directed air flow through said bed, said air flow acting to agitate, sort and separate said components according to a terminal velocity of each of said components, suction duct means above said bed for entraining a class of said components sorted and separated by said upwardly directed air flow including at least one narrow, elongate jet means extending substantially across said bed of said components, said means for entraining operating to entrain the trash out of the bed or separation zone.

2. An apparatus as claimed in claim 1, wherein the jet has a width of no more than about one fifteenth of the length of the jet.

3. An apparatus as claimed in claim 1, wherein the width of the jet is about one twentieth of the length of the jet.

4. An apparatus as claimed in claim 2, wherein the jet has an outlet having a width of about 15 to 65 mm.

5. An apparatus as claimed in claim 2, wherein the jet outlet has a width of about 40 mm.

6. An apparatus as claimed in claim 4, including three spaced apart narrow upwardly projected air flows.

7. An apparatus as claimed in claim 6, wherein at least two of said three spaced apart air flows are of a different width to each other.

8. An apparatus as claimed in claim 7, wherein an air flow located further downstream along the bed has a larger width than an air flow located upstream along the bed.

9. An apparatus as claimed in claim 8, wherein said components are definable in classes wherein each class has a characteristic terminal velocity, and the terminal velocities of the components in the class are distributed about a mean value which is the characteristic terminal velocity.

10. An apparatus as claimed in claim 9, wherein said suction duct means for entraining a class of said components includes a low speed fan drawing an entraining air flow away from the bed of components, said entraining air flow entraining low terminal velocity components.

11. An apparatus as claimed in claim 10, wherein the suction duct means operates to entrain air flow throughout and adjacent a separation zone.

12. An apparatus as claimed in claim 11, wherein the upwardly projected flow of air and the entraining air flow act cooperatively to sort and segregate classes of components.

13. An apparatus as claimed in claim 12, wherein the upwardly projected air flow has a velocity of between 20 m/s and 70 m/s.

14. An apparatus as claimed in claim 13, wherein the upwardly projected air flow has a velocity of between 30 m/s and 60 m/s.

15. An apparatus as claimed in claim 14, wherein the upwardly projected air flow has a velocity of about 50 m/s.

16. An apparatus as claimed in claim 12, wherein the entraining air flow has a velocity of between 2 m/s and 20 m/s.

17. An apparatus as claimed in claim 16, wherein the velocity of the entraining air flow is about 12 m/s.

18. A self-propelled harvester as claimed in claim 1, wherein the chopping means and the means for projecting said billets and trash into said bed or separation zone causes projection of the billets and trash into the separation zone immediately after chopping.

19. A self-propelled harvester as claimed in claim 18, wherein the conveyor means includes a belt of open mesh material.

20. A self-propelled harvester as claimed in claim 1, wherein the projection means forms an unsupported bed in the separation zone.

21. The apparatus of claim 1 wherein the suction duct means is configured to draw additional air into the duct to assist in sorting and separating the components according to terminal velocity.

22. An apparatus as claimed in claims 14, wherein the entraining air flow has a velocity of between 2 m/s and 20 m/s.

* * * * *